US006729803B1

(12) United States Patent
Baylot

(10) Patent No.: US 6,729,803 B1
(45) Date of Patent: May 4, 2004

(54) CLAMP SYSTEM FOR HOLDING A PIPE UNDER TENSION, AND A FLOATING SUPPORT INCLUDING THE SYSTEM

(75) Inventor: Michel Baylot, Marseilles (FR)

(73) Assignee: Bouygues Offshore, Montigny le Bretonneux (FR)

( * ) Notice: Subject to any disclaimer, the term of this patent is extended or adjusted under 35 U.S.C. 154(b) by 0 days.

(21) Appl. No.: 10/111,993

(22) PCT Filed: Nov. 9, 2000

(86) PCT No.: PCT/FR00/03116

§ 371 (c)(1),
(2), (4) Date: Apr. 30, 2002

(87) PCT Pub. No.: WO01/35011

PCT Pub. Date: May 17, 2001

(30) Foreign Application Priority Data

Nov. 12, 1999 (FR) .............................. 99 14525

(51) Int. Cl.[7] .................................................. F16L 1/23
(52) U.S. Cl. ................................ 405/168.4; 405/166
(58) Field of Search ........................ 405/158, 165, 405/166, 167, 168.1, 168.2, 168.3, 168.4, 169, 170, 173

(56) References Cited

U.S. PATENT DOCUMENTS

| 3,644,695 | A | * | 2/1972 | Shuey et al. | 405/170 |
|---|---|---|---|---|---|
| 3,658,222 | A | * | 4/1972 | Dressel et al. | 405/168.4 |
| 3,658,231 | A | * | 4/1972 | Gilman | 405/170 |
| 3,739,971 | A | * | 6/1973 | Silvestri et al. | 405/168.4 |
| 3,860,122 | A | * | 1/1975 | Cernosek | 405/166 |
| 4,215,950 | A | * | 8/1980 | Stevenson | 405/168.4 |
| 5,044,825 | A | | 9/1991 | Kaldenbach | 405/166 |
| 5,823,712 | A | | 10/1998 | Kalkman et al. | 405/165 |

FOREIGN PATENT DOCUMENTS

| GB | 1 278 112 | 6/1972 | F16B/1/00 |
|---|---|---|---|
| GB | 2 336 191 | 10/1999 | F16L/1/20 |
| WO | WO 98/50719 | 11/1998 | F16L/1/23 |

* cited by examiner

Primary Examiner—Frederick L. Lagman
(74) Attorney, Agent, or Firm—Cohen, Pontani, Lieberman & Pavane

(57) ABSTRACT

A clamp system installed on a floating support for holding a pipe under tension, the system comprising a tubular element having a plurality of friction shoes. Each of the shoes is mounted at the end of a piston of a hydraulic actuator. The actuators and shoes are disposed in a plurality of planes. The pistons move in translation in a direction perpendicular to the longitudinal axis of the tubular element. Each actuator includes a mechanical lock for locking the piston in its extended position.

29 Claims, 10 Drawing Sheets

CLAMP SYSTEM FOR HOLDING A PIPE UNDER TENSION, AND A FLOATING SUPPORT INCLUDING THE SYSTEM

PRIORITY CLAIM

This is a U.S. national stage of application No. PCT/FR00/03116, filed on Nov. 9, 2000. Priority is claimed from that application and from the following application: Country: France, Application No.: 99/14525, Filed: Nov. 12, 1999.

The present invention relates to holding a pipe under tension sore particularly, the present invention relates to a clamp system installed on a floating support enabling a pipe to be held under tension and locked in position. The present invention also relates to a floating support including a device for connecting together and laying successive portions of an off-shore pipe from said floating support.

The present invention thus applies to holding a substantially vertical pipe in suspension, and also to any type of duct for conveying a fluid, electricity, optical signals, or information, and in particular rigid or flexible tubular pipes, umbilical cords, and electric cables. It applies in particular to off-shore pipes handled from a ship performing installation operations, in particular over very great depths, i.e. in depths of about 1000 meters (m) or more.

Drilling operations are performed from a derrick fitted with a winch and tackle for handling a string of rods. As drilling progresses, the string is lengthened by adding rods, in general in unit lengths that are multiples of 12 m, corresponding to the height available under the hook of the derrick. Said unit length is generally assembled by screwing the new length to the already-assembled string of rods that is held in suspension from the rotary table, using a clamp system of the type having self-locking wedges that leave bite marks.

In the same manner, off-shore pipes are laid in very great depth from floating supports fitted with handling means constituted by an optionally-articulated tower, possessing handling functions similar to those of a derrick. At great depths, laying is said to be "J-laying" since the portion of the pipe between the level of the ship and its point of contact on the sea bed is J-shaped. During laying, successive pieces of pipe are connected end to end, and this requires the already-immersed portion of pipe to be held so that the end of this portion can be presented to the new piece of pipe, then to operate assembly tools, and then to guide the pipe so as to lay it in the sea. The use of clamps with marking wedges made of steel for holding the suspended portion of pipe suffers from the drawback of leaving traces on the outside of the pipe, and above all of damaging its anticorrosion coating. Numerous other types of clamp have been developed, based essentially on toggle-hinge systems or on cam-locking systems, with the movements of engaging and of disengaging a clamp often being driven by hydraulic actuators.

Such clamps are well adapted for loads that are small, but in very great depths, e.g. 2500 m, the weight of a pipe can exceed 500 (metric) tonnes and it is necessary to guarantee an extremely high level of safety whatever the type of pipe, during each stage of end-to-end connection, where a cycle can last for 15 minutes to 45 minutes, or indeed in the event of operations being interrupted for a variety of reasons such as an accident with the equipment or a storm, which might last for several days. If there is no need to ensure that the outer coating of the pipe is preserved undamaged, then clamps with marking wedges of the kind described above are entirely suitable for performing the function of holding the pipe, even if it presents irregularities in diameter, but if said coating is fragile, that type of clamp should not be used.

Numerous solutions have been developed to avoid damaging the outsides of pipes, but they are not adapted to extreme loads since they present the drawback of not guaranteeing positive safety in the event of slip phenomena starting, thereby running the risk of giving rise to severe accidents, not only to the equipment, but also to personnel.

The problem of the present invention is thus to be able, with a maximum level of safety and under extreme levels of loading, both to retain a pipe that presents an outside surface that has the reputation of being fragile, and to ensure that operation can be performed safely, even in the event of small dimensional variations in the outside shape of the pipe or its outer coating.

To do this, the present invention provides a clamp system installed on a floating support, enabling a pipe to be held under tension and comprising:n a tubular element suitable for containing said pipe coaxially and secured to said floating support at the level of its assembly plane;

said tubular element containing a plurality of friction shoes;

each of said shoes being mounted on the end of a piston of a preferably-hydraulic actuator;

said actuators and shoes being disposed in a plurality of planes of said tubular element along the longitudinal axis of said tubular element, and being distributed in each of said planes around said pipe, preferably symmetrically about said longitudinal axis of the tubular element; and said pistons moving in translation in a directions perpendicular to said longitudinal axis of said tubular element, whereby:

said friction shoes are in a clamping position against said pipe when said pistons are in an extended position, and said shoes are in a position disengaging and releasing said pipe when the pistons are in a retracted position; and each actuator being provided with means for locking said piston in the extended position. When a hydraulic actuator is used, hydraulic pressure can be relaxed while still keeping said piston in its position clamped against said pipe.

The clamp system of the invention ensures that the pipe is retained with a high level of safety since it enables the loads to be spread over a broad zone of the pipe both within a given plane and also between different planes.

While the shoes are being clamped against the pipe, it is possible to modulate the pressure applied on the shoes so that they flatten and distribute the compression force on the pipe in a manner that is substantially uniform. In addition, it is possible to apply pressures that are different between the various planes, or indeed between the various shoes within the same plane, depending on the type of pipe and on the type of outer coating.

The tubular element preferably comprises at least two, and preferably at least four shoes in each of said planes. Said tubular element comprises at least three planes, and preferably at least nine planes. Said tubular element can have 30 or even 50 friction shoes.

The pressure with which said shoes are clamped against said pipe can be adapted plane by plane or within a given plane, actuator by actuator.

Increasing the number of planes thus makes it possible to achieve the desired retaining force, insofar as the flexible elements as constituted by the friction shoes absorb displacements of the pipe.

In the clamp of the invention, the actuator may be a mechanical actuator with a lockable drive shaft or it may be a hydraulic actuator, in particular one having a leaktight check valve provided with an accumulator using a diaphragm or a piston, in particular for compensating losses through gaskets, and of a volume that is determined as a function of expected rates of leakage for the maximum length of time the clamp might need to be in operation.

Said means for locking said piston is preferably constituted by motorized screw-driving means, said piston being secured to a nut which co-operates with a motor-driven screw so as to move in translation and lock said piston in its extended position by blocking the screw.

Each of the actuators is thus provided with a motor-driven screw-and-nut device allowing the rod to be actuated into its position where it is clamped against the pipe. The screw can be blocked either by mechanically locking the rotary element, or by means of an irreversible gearing device, or indeed by mechanically locking the drive shaft since the amount of torque required for holding it is small.

Mechanical and hydraulic actuators are known to the person skilled in the art in the fields of mechanical and hydraulic engineering and they are not described in greater detail herein.

In a preferred embodiment:
said actuator comprises a hollow actuator body secured to said tubular element constituting the clamp structure;
said piston comprises a rod having a tapped bore which co-operates with a screw so that by being unscrewed said screw moves out from said bore and its end comes into abutment against the end wall of said hollow body, thereby preventing said piston from moving when it is in said extended position, and said screw has a longitudinally fluted bore co-operating with a fluted shaft extending coaxially in said screw, whereby:
said screw is screwed in and out by motor-driven rotation of said fluted shaft; and
when the screw is screwed into said rod, said piston can move freely in translation in said direction perpendicular to said longitudinal axis of the tubular element under the effect of hydraulic pressure from its retracted position in which the piston comes into abutment against the end wall of said hollow body to its extended position, in which position the end of said screw can be brought into abutment against the end wall of said hollow body, thus preventing said piston from moving when said piston is in its extended position clamped against said pipe.

Said friction shoes are preferably constituted by an elastomer layer mounted on a rigid shoe support.

In an advantageous embodiment, an elastic flexible hinge is incorporated in the shoe support or between said shoe support and the piston, said hinge transmitting stresses at the bearing surface of said friction shoe with said pipe due to movement of said pipe in translation relative to said tubular element, said translation comprising a longitudinal component along the axis of said pipe and a transverse component in a direction perpendicular to said axis of said pipe.

In particular, the elastic flexible hinge is constituted by a laminated abutment made up of a plurality of elastomer layers separated from one another by reinforcements of rigid material.

Advantageously, said laminated abutment is disposed in inclined manner, preferably at 5° to 25°, and more preferably at 10° to 20°, relative to the longitudinal axis of said tubular element so that when the pipe tends to slide along said longitudinal axis, in particular downwards, the force clamping the shoe against the pipe is increased because of a self-wedging effect. This laminated abutment in which the elastomer layers are inclined constitutes a self-wedging or self-engaging device that prevents the pipe from sliding under the effect of a load in the longitudinal direction of the axis of said pipe, insofar as said shoe maintains a surface in contact with said pipe.

In a particular embodiment, said laminated abutment is in the form of a portion of a frustoconical surface of revolution with its smaller circular base situated in particular at its bottom end so as to prevent downward sliding of said pipe, the generator line of said portion of a surface of revolution being inclined, preferably at 5° to 25°, and more preferably at 10° to 20°, relative to the longitudinal axis of said tubular element.

In an embodiment, said shoe supports are mounted on respective ball-and-socket joints enabling said supports to pivot and preferably constituted by laminated abutments of spherical type.

In an advantageous embodiment, said friction shoe is not disposed symmetrically about the plane perpendicular to the longitudinal axis comprising the axis of said actuator, said shoe being offset downwards relative to said axis of said actuator. Thus, the stress applied to the pipe by the actuator is greater near the top than it is near the bottom of the shoe. In the event of slip starting, the compression force increases, thereby giving rise to creep in the outer wall of the pipe. Said creep is greater near the top where the stress is highest, thereby increasing initiation of the self-wedging or self-engaging effect of the device.

Advantageously, said friction shoes are constituted by a plurality of blocks of elastomer material having marking-effect metal jaws interposed between them and secured to the shoe support, said jaws being set back from the bearing surface constituted by said blocks. Thus, in normal operation, the entire load is transferred from the shoe to the pipe via said blocks of synthetic material. However, in the event of the radial force becoming excessive, creep of the outer wall of the pipe puts a portion of said outer wall into contact with said metal elements that produce a marking effect, thus providing an ultimate degree of safety under extreme conditions, while nevertheless minimizing the traces created by the metal jaws on the coating of the pipe.

In an advantageous embodiment, a beam is disposed between the piston and the shoe substantially parallel to the longitudinal axis of the tubular element, said beam being connected to a beam support via a hinge whose axis is situated at the bottom of the beam, said support element for the beam itself being secured to the tubular element. This embodiment makes it possible to reduce considerably the bending forces that are applied on the axis of the actuator, since vertical forces are taken up by said beam.

The present invention also provides apparatus for connecting together and laying successive lengths of an offshore pipe from said floating support. According to the invention, said apparatus includes a clamp system in order to lock and hold in suspension a first portion of pipes in a vertical or an inclined position, ready for assembly with a second portion of pipe prior to said first portion of off-shore pipe being fully immersed.

Other aspects, characteristics, and advantages of the present invention will appear more clearly on reading the following description given in illustrative and non-limiting manner and with reference to the accompanying drawings in which the support is a tower.

Figure 5:
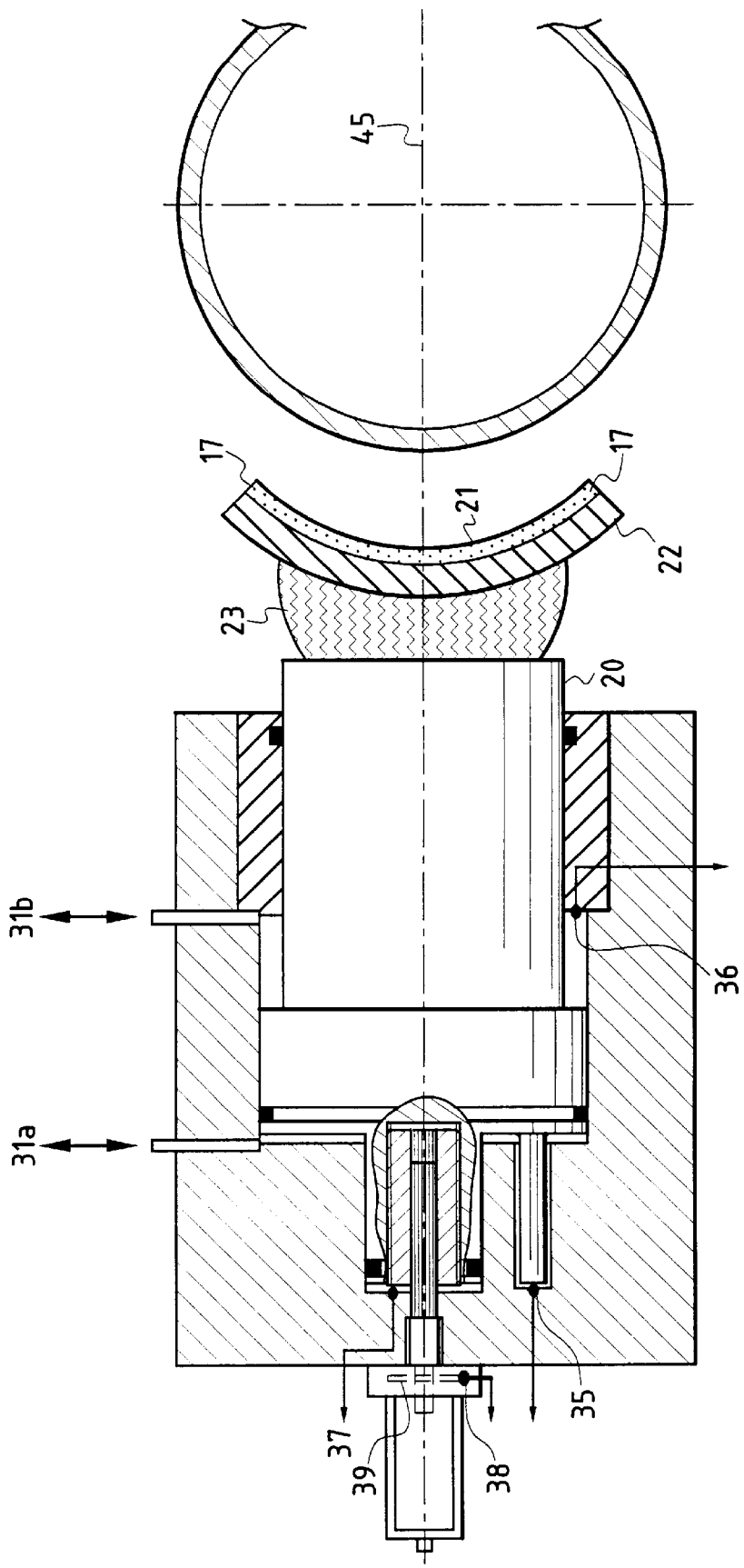
Figure 6:
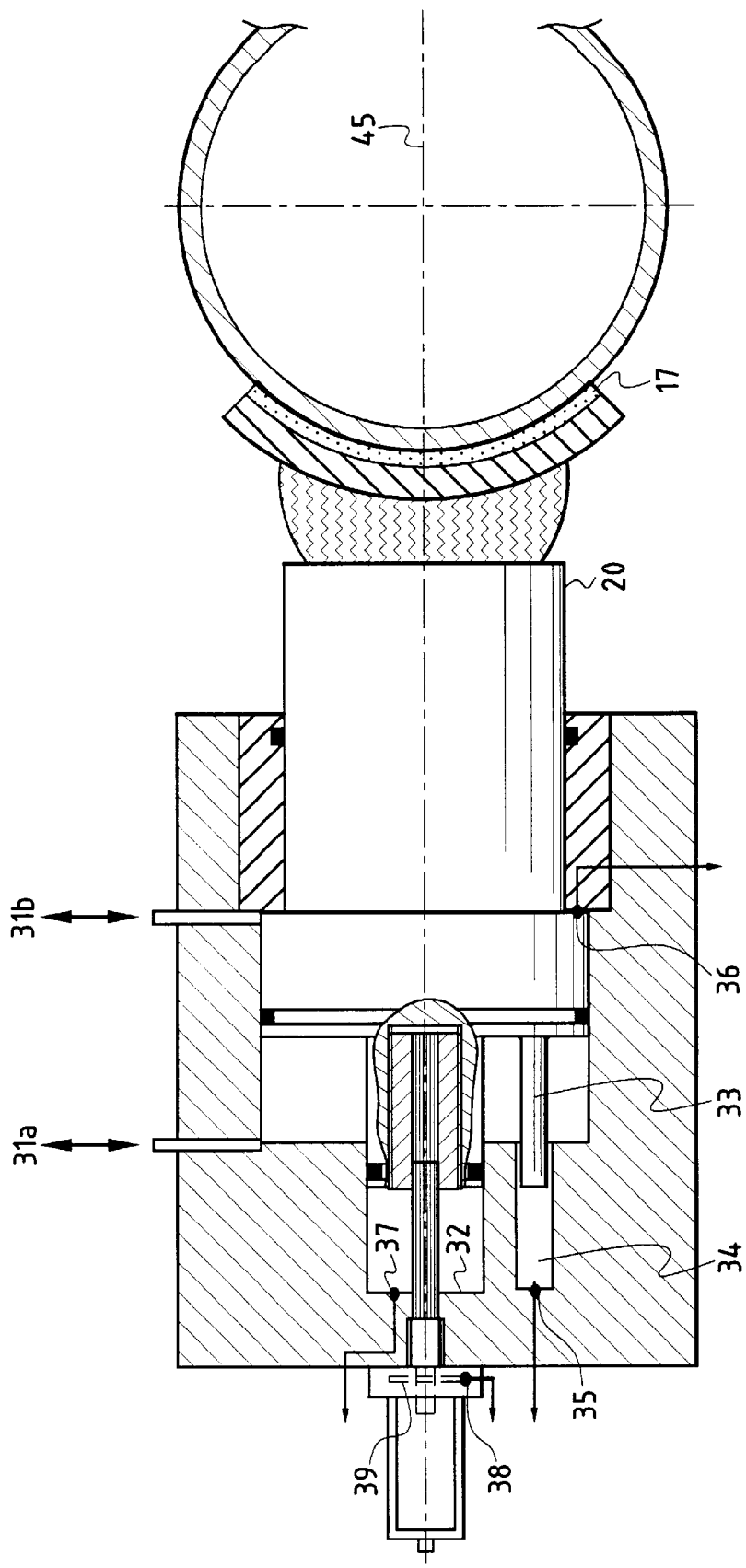
Figure 7:
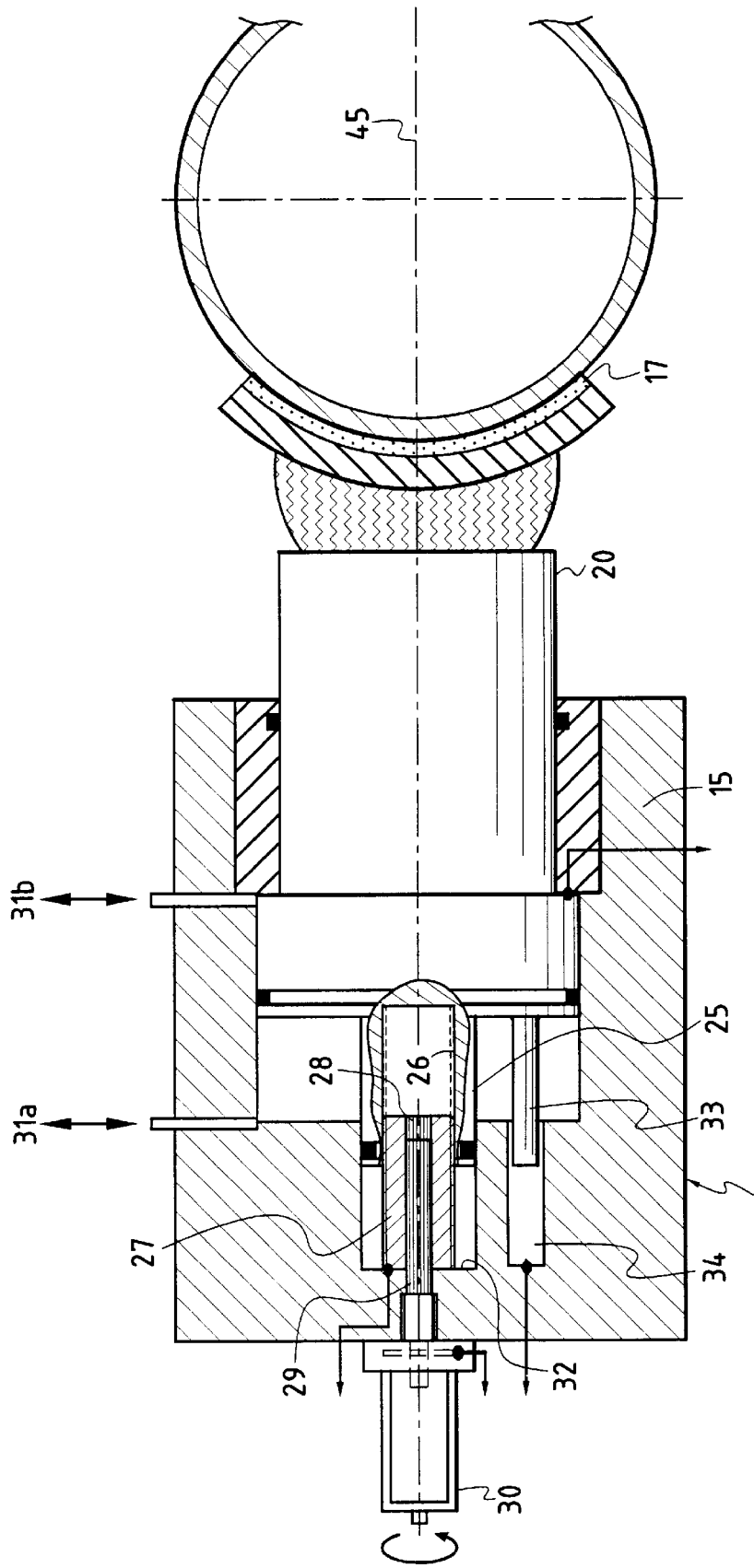
Figure 8:
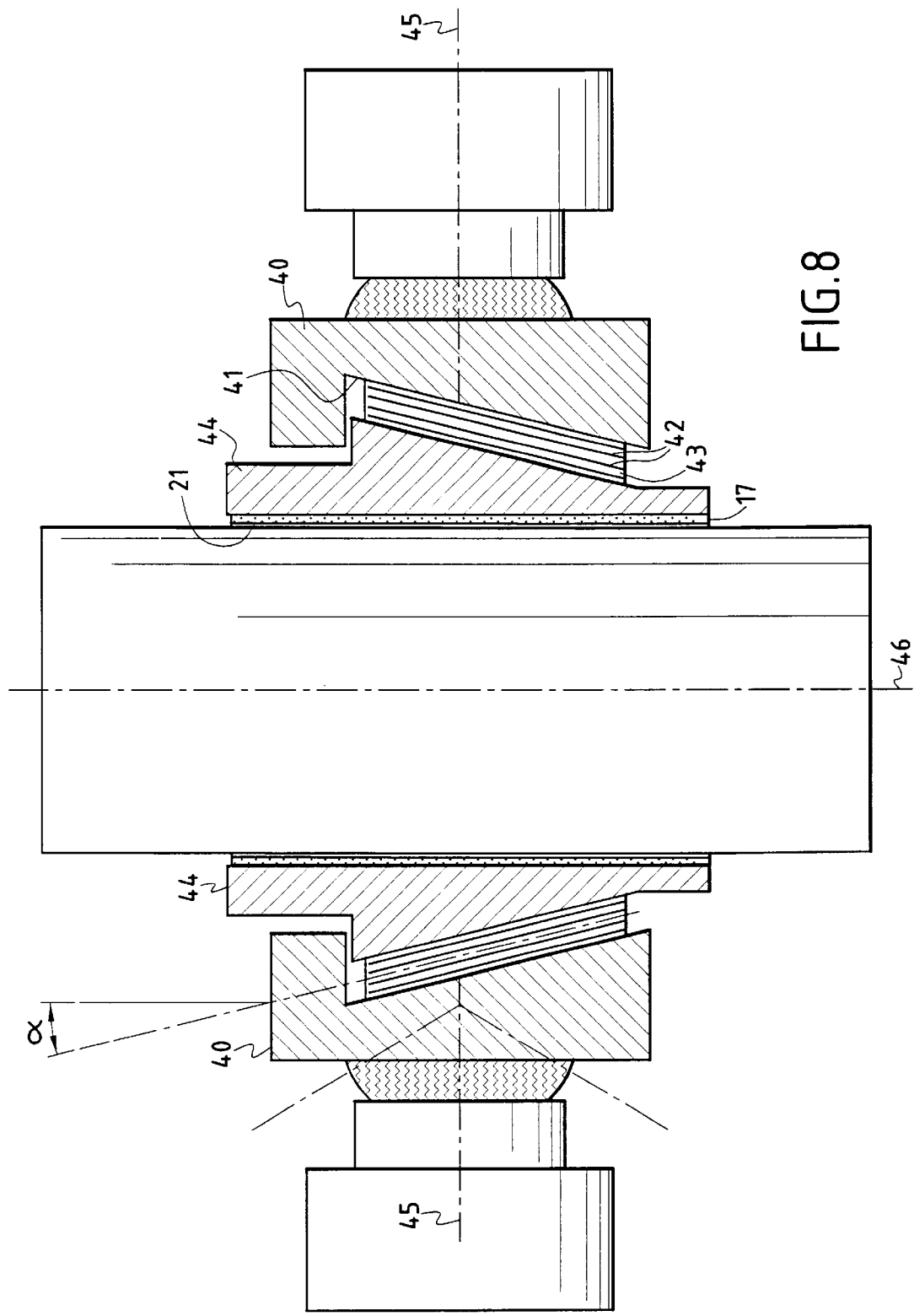
Figure 9:
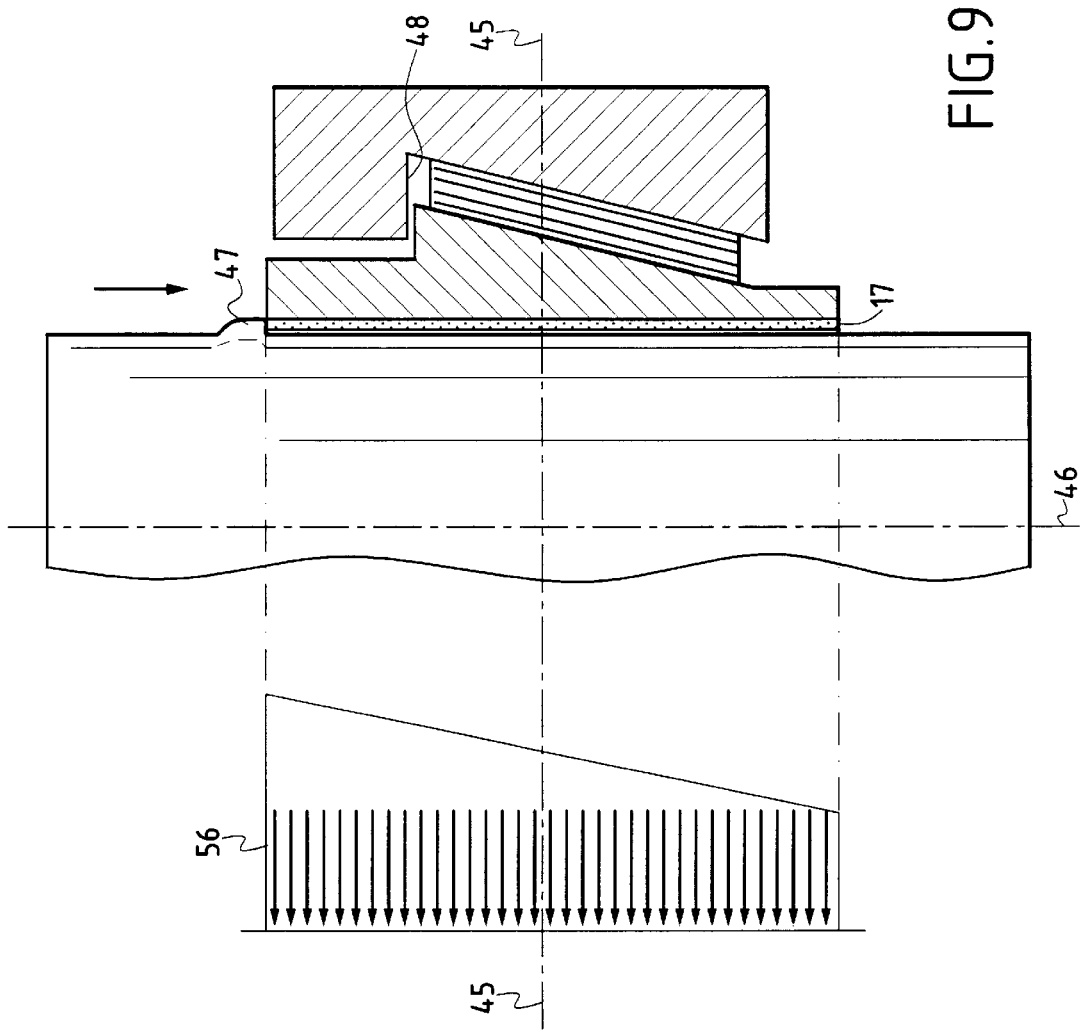
Figure 10:
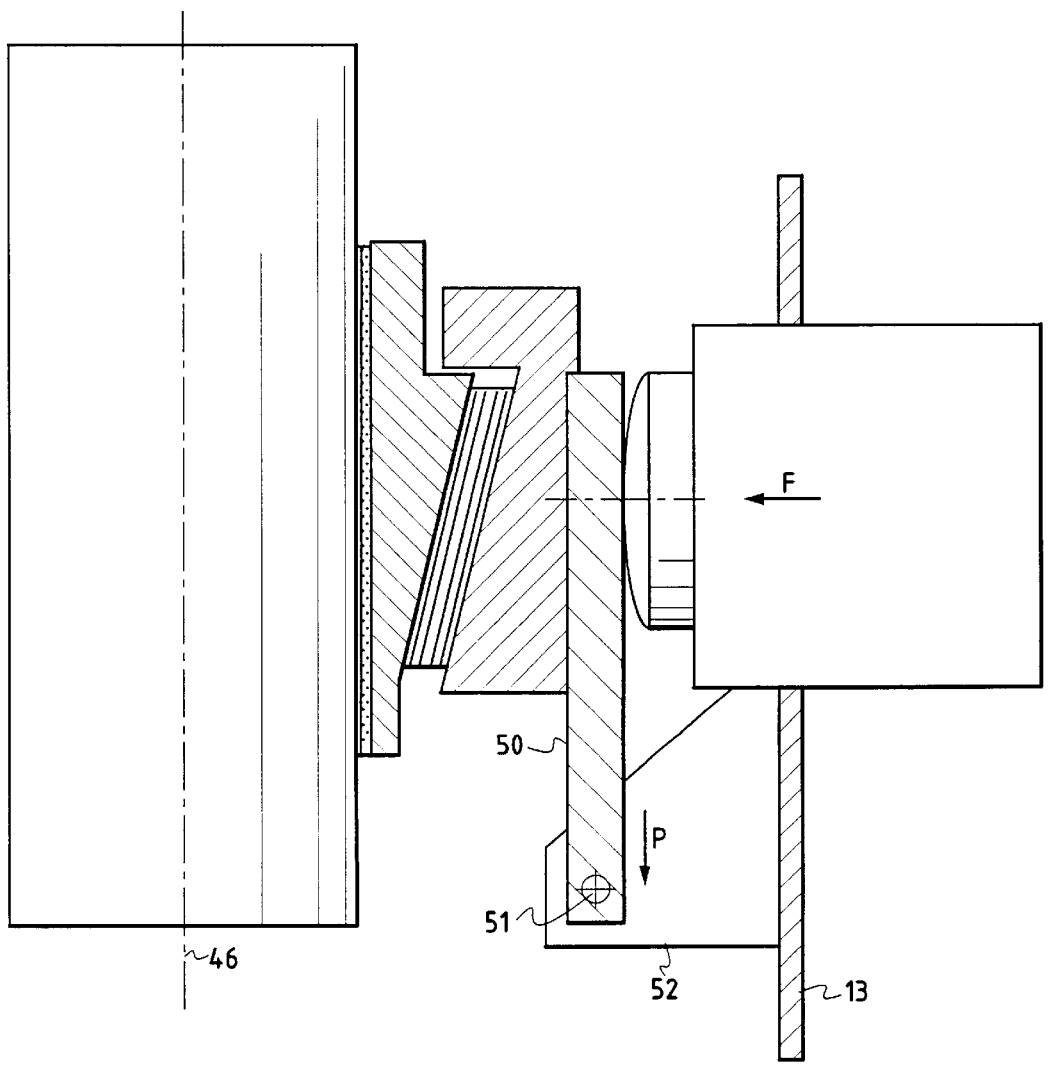
Figure 11:
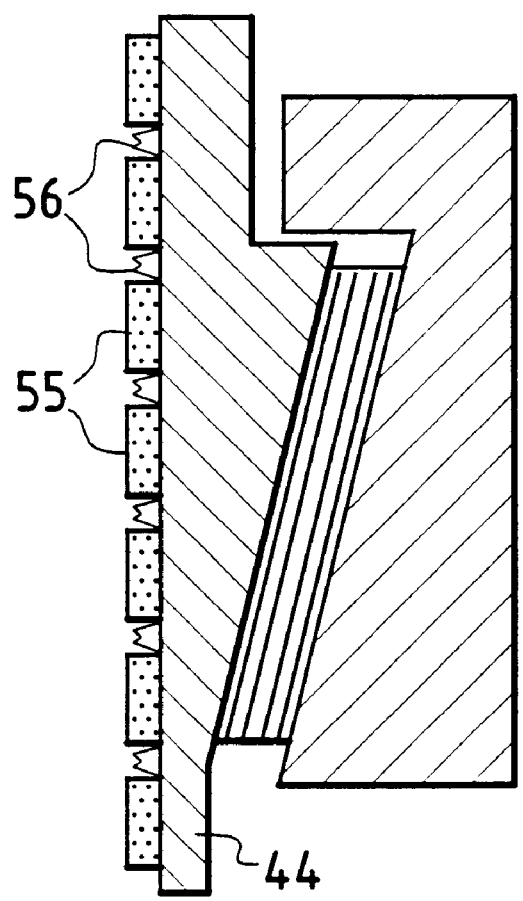

FIGS. 5, 6, and 7 are section views of a hydraulic actuator shown respectively in its retracted position, in its retaining position, and in its safe retaining position;

FIG. 8 is a side view in section through the end of the actuator rod, showing details of a device for pressing against the outside wall of the pipe, with a self-engaging effect;

FIG. 9 is a view similar to FIG. 8 showing the effects of the actuator axis being offset relative to the surface of the shoe in contact with the pipe;

FIG. 10 is a side view in section showing a device enabling the retaining force to be transmitted directly to the structure of the clamp; and FIG. 11 is a side view in section showing a bearing shoe combined with marking jaws.

Figure 1:
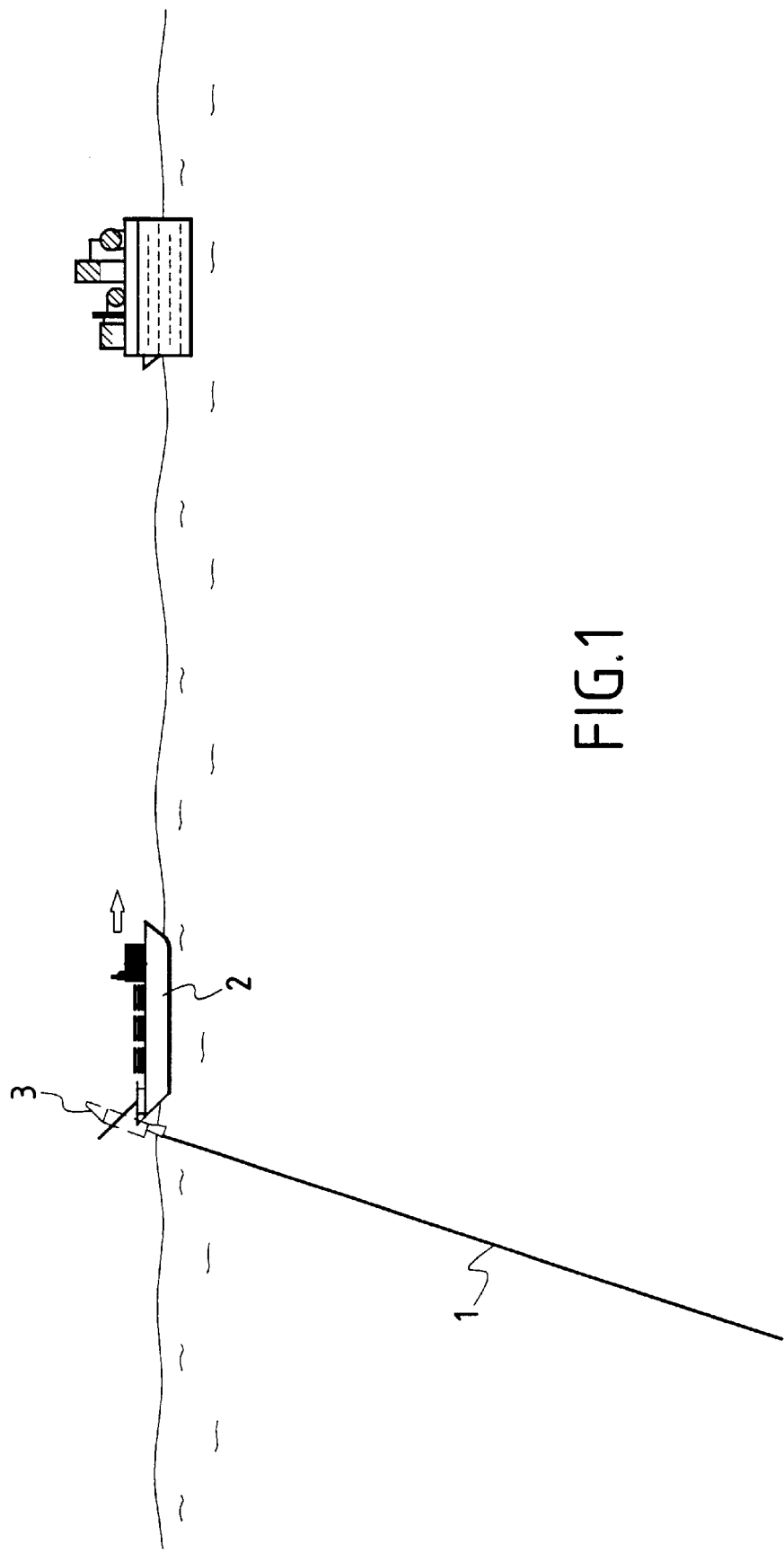
FIG. 1 is a diagrammatic side view of a pipe being J-laid at great depth from a ship fitted with a tower for laying off-shore pipes.
Figure 2:
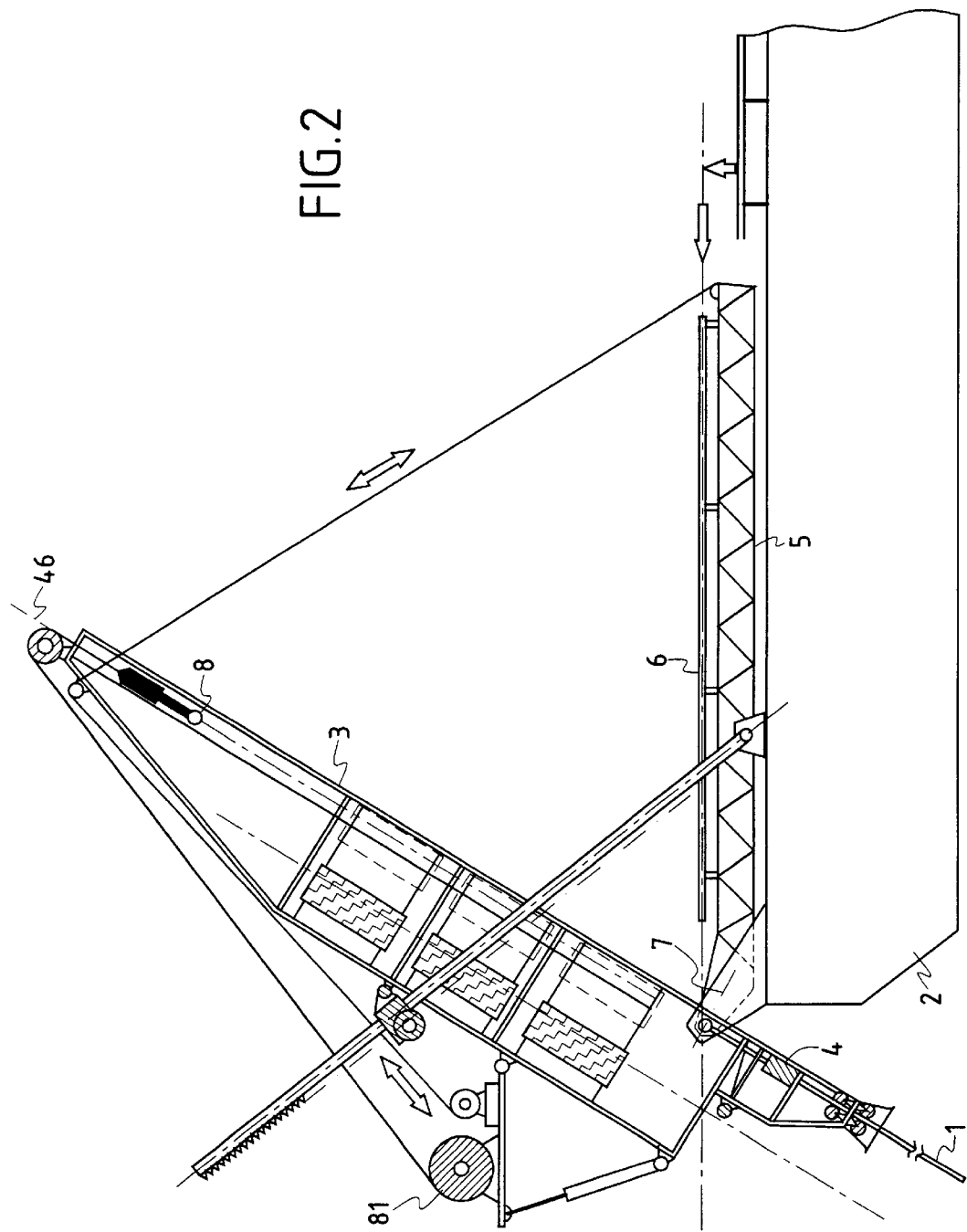
FIG. 2 is a side view of a J-laying ship showing in detail the accessories for laying an off-shore pipe step by step.

FIGS. 1 and 2 are a side view showing a pipe 1 being J-laid at great depth from a ship 2 fitted with a tower 3 for laying off-shore pipes.

In this case, the invention applies to laying a pipe made up of rectilinear sections or "stands" 6 that are assembled together and laid one after another, each section possibly itself being constituted by a plurality of individual lengths of pipe assembled together to constitute a stand. As a general rule an individual length is 12 m long.

A stand 6 is made up of a plurality of individual unit lengths assembled together, in particular by welding.

At the base of the laying tower, a clamp 4 of the invention holds the pipe 1 in suspension while waiting for the loading arm 5 carrying a stand 6 constituted by an additional length of pipe to be raised. After the beam 5 carrying the stand 6 has been raised until the axis of the stand coincides with the sloping main axis 46 of the tower, the top end of the stand 6 is taken hold of by a grip 8 and the assembly is lowered until the bottom end of the stand comes into contact with the suspended pipe in an assembly plane 7. The assembly operations, e.g. by welding, are performed at the assembly plane 7.

The clamp 4 holds the assembly throughout the duration of the assembly operation, and then after the tension has been taken up at the top end of the pipe by means of a main winch 81 connected to the grip 8, the clamp 4 can be relaxed to release the pipe whose top end is then lowered in turn down to the assembly plane 7. The clamp is then reactivated to support the pipe ready to perform the following cycle.

Figure 3:
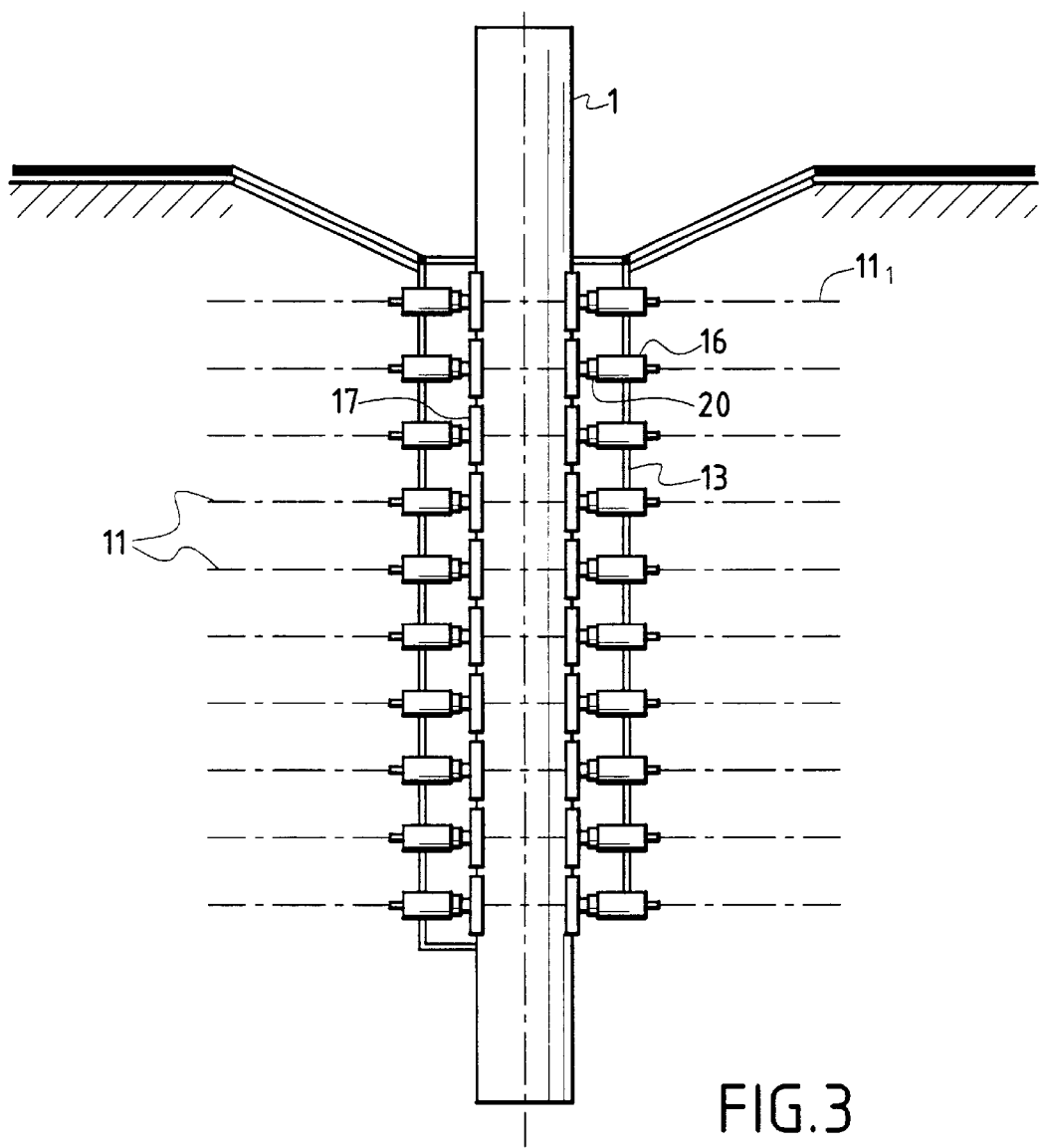
FIG. 3 is a side view of a clamp comprising a multiplicity of actuators organized in a multiplicity of planes.
Figure 4:
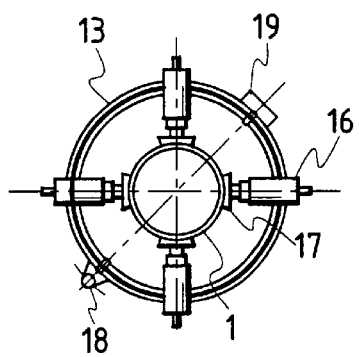
FIG. 4 is a section view from above relating to FIG. 3.

In FIGS. 3 and 4, a tubular element 13 is suitable for containing said pipe 1 coaxially and is secured to said floating support 2 at the assembly plane 7.

Said tubular element 13 contains a plurality of friction shoes 17. Each of said shoes is mounted at the end of a piston 20 of a preferably hydraulic actuator 16. Said actuators 16 and shoes 20 are disposed in a plurality of planes 11 of said tubular element 13 along the longitudinal axis 46 of said tubular element, and they are distributed within each of said planes around said pipe, symmetrically about said longitudinal axis 46 of the tubular element 13.

FIG. 3 is a side view of a clamp 4 comprising a tubular structure 13 having ten planes 11, each of which has four actuators 16 regularly distributed around the substantially tubular structure 13, said structure holding the actuators 16 together and likewise holding the various planes together. The pressure with which said shoes are pressed against said pipe is adapted plane by plane.

The pistons constituting the ends of the actuator rods 16 are fitted with shoes 17 that match the shape of the pipe 1 so as to avoid damaging its surface when the actuator is applying maximum force to the pipe.

FIG. 4 is a section view seen from above with reference to FIG. 3, on the level of a plane 111, showing the structure of the clamp 4, which is preferably circular, together with four actuators 16 provided with their shoes 17 and preferably distributed uniformly around said structure. The clamp can be opened by means of a hinge 18 disposed diametrically opposite a latch 19, with opening being either under manual control or under remote control, e.g. using a hydraulic actuator that is not shown.

In FIGS. 5 to 7, the elastomer layer forming the bearing surface 21 whereby said shoe 17 presses against the pipe has a shape which, in longitudinal section, constitutes a portion of a cylinder occupying an arc whose circular curvature matches the shape of said pipe to be supported.

FIGS. 5, 6, and 7 are sections through a hydraulic actuator shown respectively in its retracted position (FIG. 5), in its retaining position (FIG. 6), and in its safe retaining position (FIG. 7). Said pistons 20 move in translation along a direction 45 perpendicular to said longitudinal axis 46 of said tubular element 13 such that said friction shoes 17 are in the retaining position, i.e. clamped against said pipe 1, when said pistons 20 are in the extended position, as shown in FIGS. 6 and 7, and said shoes are in the disengaged position, releasing said pipe, when the pistons are in the retracted position, as shown in FIG. 5.

Each actuator is thus provided with means for locking said piston in the extended position, it then being possible to relax the hydraulic pressure in said actuator while still retaining said piston in its clamping position against said pipe.

Said means for locking said piston 20 is constituted by motorized screw-driving means 30, said piston being secured to a nut which co-operates with a motor-driven screw 27 so as to move said piston in translation and lock it in the extended position by locking the screw.

Each actuator 16 comprises a hollow actuator body 15 secured to the structure 13 of the clamp 4. A piston 20 has a bearing shoe 17 fitted to the end thereof via a support 22 which is secured to the piston 20 via a hinge 23 such as a ball-and-socket joint or a laminated abutment made up of a stack of metal sheets separated by layers of elastomer. The shoe 17 is advantageously constituted by a layer of elastomer, or it can be a laminated abutment of cylindrical type. Such laminated abutments are manufactured by Techlam (France).

As shown in detail in FIG. 7, the piston 20 of the actuator 16 is of the type having two rods, possessing on the right-hand side of the figure a rod 20 with the presser shoe device installed at its end, and on the left-hand side of the figure a rod end 25 which remains inside the actuator body 15 and which has a tapped bore 26. The tapped bore 26 can co-operate with a screw 27 whose own axis is pierced by a bore 28 presenting fluting parallel to the axis of said screw. This fluted bore 28 receives the fluted shaft 29 of a rotary actuator 30 such as an electric or hydraulic motor. Thus, when the piston 20 of the actuator is fully or partially extended, it is possible to turn the screw 27 by means of the external motor 30 and to make it penetrate or withdraw depending on the direction of rotation selected. The actuator 16 is actuated by injecting oil via the orifice 31a for clamping onto the pipe or via the orifice 31b for retracting the actuator.

More precisely, the tapped bore 26 co-operates with the screw 27 such that by being unscrewed said screw moves out from said bore 26 and its end comes into abutment against the end wall 32 of said hollow body, thereby locking movement of said piston 20 when it is in said extended position. Said screw 27 has a longitudinally fluted bore 28 co-operating with a fluted shaft 29 extending coaxially inside said screw so that:

said screw is tightened and/or loosened by motor-driven rotation of said fluted shaft 29; and when the screw is screwed into the inside of said rod 25, said piston 20 is free to move in translation in said direction 45 perpendicular to the longitudinal axis 46 of the tubular element 13 under drive from hydraulic pressure from its retracted position in which the end of the rod 25 of the piston 20 comes into abutment against the end wall 32 of said hollow body to its extended position, in which position the end of said screw can be brought into abutment against the end wall 32 of said hollow body, thus locking said piston against moving when it is in the extended position clamped against said pipe.

FIG. 5 shows the actuator retracted, the safety screw 27 being retracted inside the rod 25.

FIG. 6 shows the actuator extended, clamping against the pipe 1, with the safety screw 27 still retracted inside the rod 25.

In FIG. 7, the motor 30 has turned the screw 27 until it comes into abutment against the end wall 32 of the body of the actuator 16. The screw 27 moves in translation relative to the axis of the shaft 29 because the presence of the fluting allows it to slide; in this position, the pressure in the actuator can be relaxed while leaving the assembly in a safe configuration.

The sequence for relaxing the clamp takes place as follows: a) all of the actuators are pressurized; b) the safety screw 27 is unlocked by being screwed into the rod 25; and c) the pressure is relaxed and the actuators are retracted, thereby releasing the pipe.

In addition, in FIG. 7, a rod 33 secured to the piston 20 co-operates with the bore 34 secured to the actuator body so as to prevent the piston from turning, thereby maintaining the axis of the bearing shoe substantially parallel to the axis of the pipe 1. Position sensors 35-36-37 enable the following pieces of information to be sent to the surface: a) actuator retracted; b) actuator extended; c) safety screw in action.

By way of example, a sensor 38 co-operates with a toothed wheel 39 making it possible to send information to the surface relating to the position of the screw 27 inside the bore of the actuator rod 25. By proceeding in this way, it is advantageously possible to establish a known offset between the axis of the pipe and the axis of the clamp. This is possible only if all of the actuator rods are long enough to ensure that none of them are at the ends of their strokes when the pipe is effectively clamped. For this purpose, one, or preferably two, series of clamps are positioned in the desired offset position, and then after these clamps have been locked in position, the remaining clamps are actuated using the normal procedure.

In FIGS. 8 to 11, said friction shoes 17 are constituted by a layer of elastomer mounted on a rigid shoe support 22. An elastic flexible hinge 42/43 is incorporated between said shoe support 40/44 and the piston 20. The hinge 42/43 transmits stresses at the bearing surface 21 of said friction shoe 17 against said pipe 1 as said pipe moves in translation relative to said tubular element, said movement in translation comprising a longitudinal translation component along the axis 46 of said pipe and a transverse component in a direction 45 perpendicular to said axis 46 of said pipe. The elastic flexible hinge 42, 43 is constituted by a laminated abutment made up of a plurality of elastomer layers 43 separated from one another by reinforcement 42 of rigid material.

In longitudinal section, said laminated abutment is in the form of a portion of a frustoconical surface of revolution about the axis of said pipe with its smaller circular base being situated at its bottom end. This laminated abutment in which the elastomer layers are inclined thus constitutes a self-wedging or self-engaging device preventing the pipe from sliding under the effect of a load in the longitudinal direction along the axis of said pipe, while maintaining a contact area with said pipe.

FIG. 8 shows a self-wedging, self-engaging device of the invention comprising a support 40 secured to the end of the actuator rod and presenting a face 41 that is inclined at an angle $\alpha$ of 5° to 25°, having a laminated abutment fixed thereon that is constituted by metal sheets 42 separated by elastomer layers 43, said laminated abutment being secured to the support 44 of the shoe 17 whose shape matches that of the pipe to be supported. The laminated abutment and support assemblies are preferably circularly symmetrical occupying a circular arc subtending an angle that is inversely proportional to the number of actuators, so that there is no interference between two adjacent assemblies.

In FIG. 8, two shoes are shown in opposition and exerting a thrust force on the pipe along the axis 45, thereby creating a retaining force by means of friction with the shoes 17 acting in a direction parallel to the axis 46 of the pipe 1 and proportional to said clamping force. The coefficients of friction usually observed between elastomers generally lie in the range 0.05 to 0.15 which means that there is a retaining force of 5 tonnes to 15 tonnes for a clamping force of 100 tonnes. According to the principles of mechanics, coefficient of friction is theoretically independent of the area of the shoe, however said area must not be too small since the pressure on the shoe then becomes too high and the coating surface on the pipe deforms, so that by its material creeping there is a reduction in the acceptable vertical load, and that goes against the desired aim.

When clamping two opposite shoes, the laminated abutments 42–43 and the bearing shoes 17 are compressed and distribute the compressive force substantially uniformly over the pipe. When all of the actuators situated in each of the planes are clamped, the pipe held by the grip can be released and the set of shoes then comes into action exerting, by friction, a total load that can reach or even exceed 500 tonnes.

After the grip has been released, the load-bearing wall of the suspended pipe presents practically no stress immediately above the clamp, whereas below the clamp the stress is at a maximum. In each of the planes, the amount of stress increases by an amount corresponding to the increase in the tension created by the actuators of that plane. As a result the pipe-lengthens very slightly under the effects of said increase in tension. A result of this slight lengthening is to create a small amount of shoe slip once the limit value for the adhesion of said shoe has been reached. Laminated abutments incorporated in the system at the abutment shoe, at the sloping plane, or indeed at the ends of the actuator rods, have the effect not only of distributing the forces of the actuators over the pipe within a given plane, but also of distributing loads between the various planes by absorbing said small amounts of lengthening, thereby delaying correspondingly the beginning of actual slip.

When the pipe tends to slip downwards, the device shown in FIG. 8 presents a self-engaging or self-wedging effect which increases the clamping force, thereby retarding slip phenomena. If the angle a is small, the self-wedging effect is at a maximum, with an angle in the range 5° to 25° in association with the laminated abutments achieving the desired engagement effect.

In FIG. 9, a single shoe is shown and it is not placed symmetrically relative to the plane perpendicular to the longitudinal axis 46 containing the axis 45 of said actuator, with the bearing surface 21 of the shoe being slightly offset downwards relative to the axis 45 of the actuator. As a result, the stress applied to the pipe by the actuator is greater near the top than it is near the bottom of the shoe, as represented by the associated graph 56. At the beginning of slip, there is thus an increase in the compression force which causes the outer wall of the pipe to creep. This creep is greatest near the top where the stress is highest, thus giving rise to a bulge 47 which increases the self-wedging, self-engaging effect of the device. In normal operation, it is essential to avoid this kind of damage, however it does provide an ultimate safety margin for the clamp of the invention in the event of the load on the pipe accidentally rising suddenly, e.g. from 500 tonnes to 800 tonnes or even 1000 tonnes, due to short-duration transient phenomena such as a shock caused by a pitch cycle of the ship in which the stern of said ship is suddenly in the air and then hits the surface of the water hard. All of the equipment is dimensioned to have safety margins that are sufficient, in this kind of situation, to avoid elements of the structure breaking. In contrast, in a clamp of the invention, although it is absolutely essential to avoid losing control of the suspended line, localized deterioration can be accepted under extreme conditions so long as the probability of such conditions occurring remains low or negligible.

FIG. 10 is a side view similar to FIG. 8 showing a device of the invention comprising a thrust actuator with a safety device (not shown) bearing against a bearing shoe in contact with the pipe via a beam provided at the bottom of a hinge on an axis 51 securing the beam to a bracket 52, itself secured to the structure of the tubular element 13 of the clamp. With this configuration, the pressure forces F applied by the actuator on the pipe are transmitted directly to the shoe while the vertical force P holding said pipe is transmitted by the beam directly through said bracket 52. This avoids bending forces in the actuator rod and in the body of said actuator, thereby considerably simplifying its design and reducing its bulk.

FIG. 11 is a side view of a shoe for bearing against the pipe, which shoe presents alternating blocks of synthetic material 55 having metal jaws 56 interposed between them and set back slightly, said jaws 56 having a marking effect and being secured to the shoe support. Thus, in normal operation, the entire load is transferred from the shoe to the pipe via said blocks of synthetic material, however in the event of the radial force becoming excessive, e.g. because of the self-engaging effect, creep of the outside wall of the pipe then brings a portion of said outside wall into contact with said metal elements that reduce a marking effect, thereby increasing clamp safety under extreme conditions, while leaving minimum traces on the coating of the pipe.

The clamp of the invention can also be used in specialized ships for holding undersea cables during certain operations at sea, e.g. during repairs where it is necessary to hold the cable safely without damaging it during periods of time that can exceed several days.

What is claimed is:

1. A clamp system installed on a floating support enabling a pipe to be held under tension, the system comprising:
   a tubular element suitable for containing said pipe and secured to said floating support;
   said tubular element containing a plurality of friction shoes,
   each of said shoes being mounted on the end of a piston of a hydraulic actuator;
   said actuators and shoes being disposed in a plurality of planes of said tubular element along the longitudinal axis of said tubular element, and being distributed in each of said planes around said pipe; and
   said pistons moving in translation in a direction substantially perpendicular to said longitudinal axis of said tubular element, whereby:
   said friction shoes are in a clamping position against said pipe when said pistons are in an extended position, and said shoes are in a position disengaging and releasing said pipe when the pistons are in a retracted position; and
   each actuator is provided with mechanical means for locking said piston in the extended position.

2. A clamp system according to claim 1, wherein said means for locking said piston is constituted by motorized screw-driving means, said piston being secured to a nut which co-operates with a motor-driven screw so as to move in translation and lock said piston in its extended position by locking the screw.

3. A clamp system according to claim 2, wherein the screw is locked mechanically.

4. A clamp system according to claim 3, wherein:
   said actuator comprises a hollow actuator body secured to said tubular element;
   said piston comprises a rod having a tapped bore which co-operates with a screw in such a manner that on being unscrewed said screw leaves said bore and its end comes into abutment against the end wall of said hollow body, thereby preventing said piston from moving while it is in said extended position; and
   said screw has a longitudinally fluted bore cooperating with a fluted shaft extending coaxially in said screw, such that:
   said screw is tightened and loosened by motor-driven rotation of said fluted shaft; and
   when said screw is screwed into said rod, said piston is free to move in translation in said direction substantially perpendicular to said longitudinal axis of the tubular element under drive from hydraulic pressure from its retracted position in which the piston comes into abutment against the end wall of said hollow body to its extended position, in which position the end of said screw can be brought into abutment against the end wall of said hollow body thus preventing movement of said piston when said piston is in its extended position clamped against said pipe.

5. A clamp system according to claim 1, wherein said friction shoes are constituted by at least one layer of elastomer mounted on a rigid shoe support.

6. A clamp system according to claim 1, wherein an elastic flexible hinge is disposed relative to said shoe support and said piston, so as to transmit stresses at the bearing surface of said friction shoe against said pipe due to movement of said pipe in translation relative to said tubular element, said translation having a longitudinal component along the axis of said pipe and a transverse component along a direction perpendicular to said axis of said pipe.

7. A clamp system according to claim 6, wherein the elastic flexible hinge is constituted by a laminated abutment constituted by a plurality of elastomer layers separated from one another by reinforcements of rigid material.

8. A clamp system according to claim 7, wherein said laminated abutment is inclined, relative to the longitudinal axis of said tubular element so that when the pipe tends to slip along said longitudinal axis, the force clamping the shoe against the pipe is increased by a self-wedging effect.

9. A clamp system according to claim 8, wherein said laminated abutment is in the form of a portion of a fusto-conical surface of revolution.

10. A clamp system according to claim 5, wherein said shoe supports are mounted on respective ball-and-socket joints enabling said supports to pivot.

11. A clamp system according to claim 1, wherein the tubular element includes at least two, shoes in each of said planes.

12. A clamp system according to claim 11, wherein said tubular element includes at least three planes.

13. A clamp system according to claim 1, wherein the pressure clamping said shoes against said pipe is adaptable actuator by actuator.

14. A clamp system according to claim 1, wherein the pressure clamping said shoes against said pipe is adaptable plane by plane.

15. A clamp system according to claim 1, said tubular element comprising at least one hinge enabling said tubular element to be opened about one of its longitudinal generator lines.

16. A clamp system according to claim 1, further comprising at least one friction shoe offset relative to said axis of said actuator, downwards from a plane perpendicular to the longitudinal axis containing the axis of said actuator.

17. A clamp system according to claim 1, wherein said friction shoes are constituted by a plurality of blocks of elastomer material between which there are interposed metal jaws having a marking effect which are secured to the shoe support, said jaws being set back from the bearing surfaces of said blocks.

18. A clamp system according to claim 1, wherein a beam is disposed between the piston and the shoe substantially parallel to the longitudinal axis of the tubular element, said beam being connected to a beam support by a hinge about an axis situated at the bottom of the beam, said beam support element itself being secured to the tubular element.

19. A floating support including apparatus for connecting and laying successive portions of an off-shore pipe from said floating support, the apparatus including a clamp system according to claim 1 for locking and holding in suspension a first portion of pipe in a vertical position to be assembled with a second portion of pipe prior to said first portion of off-shore pipe being fully immersed.

20. The clamp system of claim 1, wherein said actuators and shoes are disposed symmetrically about said longitudinal axis of said tubular element.

21. The clamp system of claim 8, wherein said laminated abutment is inclined at an angle relative to said longitudinal axis o said tubular element, and said angle is in the range of from about 5° to about 25°.

22. The clamp system of claim 21, wherein said angle is in the range of from about 10° to about 20°.

23. The clamp system of claim 10, wherein said ball-and-socket joints include spherical laminated abutments.

24. The clamp system of claim 11, wherein said tubular element includes at least four shoes in each of said planes.

25. The clamp system of claim 12, wherein said tubular element includes at least nine planes.

26. A floating support including apparatus for connecting and laying successive portions of an off-shore pipe from said floating support, the apparatus including a clamp system according to claim 1 for locking and holding in suspension a first portion of pipe in a sloping position to be assembled with a second portion of pipe prior to said first portion of off-shore pipe being fully immersed.

27. The clamp system of claim 6, wherein said flexible hinge is incorporated in said shoe support.

28. The clamp system of claim 6, wherein said flexible hinge is disposed between said shoe support and said piston.

29. A clamp system installed on a floating support enabling a pipe to be held under tension, the system comprising:

a tubular element suitable for containing said pipe and secured to said floating support;

said tubular element containing a plurality of friction shoes;

each of said shoes being mounted on the end of a piston of an actuator;

said actuators and shoes being disposed in a plurality of planes of said tubular element along the longitudinal axis of said tubular element, and being distributed in each of said planes around said pipe, about said longitudinal axis of the tubular element; and said pistons moving in translation in a direction substantially perpendicular to said longitudinal axis of said tubular element, whereby:

said friction shoes are in a clamping position against said pipe when said pistons are in an extended position, and said shoes are in a position disengaging and releasing said pipe when the pistons are in a retracted position; and each actuator being provided with means for locking said piston in the extended position, said means for locking said piston including motorized screw-driving means, said piston being secured to a nut which co-operates with a motor-driven screw so as to move in translation and lock said piston in its extended position by locking the screw.

* * * * *